United States Patent
Russke et al.

(10) Patent No.: US 6,786,525 B2
(45) Date of Patent: Sep. 7, 2004

(54) CONVERTIBLE VEHICLE

(75) Inventors: Klaus Russke, Bohmte (DE); Udo Heselhaus, Ibbenburen (DE)

(73) Assignee: Wilhelm Karmann GmbH, Osnabrück (DE)

(*) Notice: Subject to any disclaimer, the term of this patent is extended or adjusted under 35 U.S.C. 154(b) by 0 days.

(21) Appl. No.: 10/250,124

(22) Filed: Jun. 5, 2003

(65) Prior Publication Data

US 2003/0227189 A1 Dec. 11, 2003

(51) Int. Cl.[7] ............................................. B62D 25/10
(52) U.S. Cl. ................ 296/76; 296/107.08; 296/136.06
(58) Field of Search ............................ 296/76, 107.08, 296/136.06, 136.03

(56) References Cited

U.S. PATENT DOCUMENTS

| | | | | |
|---|---|---|---|---|
| 3,377,099 A | * | 4/1968 | Podolan | 296/136.06 |
| 6,145,915 A | * | 11/2000 | Queveau et al. | 296/107.08 |
| 6,425,621 B2 | | 7/2002 | Miklosi et al. | 296/108 |
| 6,511,118 B2 | * | 1/2003 | Liedmeyer et al. | 296/107.08 |
| 6,604,775 B2 | * | 8/2003 | Obendiek | 296/107.08 |
| 6,663,163 B2 | * | 12/2003 | Koch | 296/107.08 |
| 2003/0218353 A1 | * | 11/2003 | Russke | 296/107.08 |

FOREIGN PATENT DOCUMENTS

| | | |
|---|---|---|
| DE | 37 43 502 | 7/1989 |
| DE | 100 39 680 | 7/2002 |

\* cited by examiner

*Primary Examiner*—Jason Morrow
(74) *Attorney, Agent, or Firm*—Gudrun E. Huckett

(57) ABSTRACT

A convertible vehicle has a carbody with a rear area provided with a trunk lid. A roof is stowable within the rear area of the convertible vehicle underneath the trunk lid. The trunk lid is movable in a first direction for releasing a passageway for the roof and in a second direction for releasing a receiving opening for luggage. The trunk lid is divided into several parts along at least one joint extending substantially in a transverse vehicle direction. When opening the trunk lid in the first direction, a frontmost one of the several parts of the trunk lid, viewed in a travel direction of the convertible vehicle, is moved in the travel direction at least partially into a position above a rear part of the lid.

13 Claims, 5 Drawing Sheets

CONVERTIBLE VEHICLE

BACKGROUND OF INVENTION

1. Field of the Invention.

The invention relates to a convertible vehicle having a roof or top stowable underneath a trunk lid, wherein the trunk lid is movable in a first direction for releasing a passageway for the roof and in a second direction for releasing a receiving opening for luggage, wherein the trunk lid is divided into several parts along a joint extending substantially in a transverse vehicle direction.

2. Description of the Related Art.

In vehicles of the aforementioned kind it is known to pivot the trunk lid as a whole into an open position about an axis positioned to the rear of the vehicle and extending transversely to the vehicle. In this way, the passageway for the roof to be opened or closed is released. For releasing a receiving opening for luggage, usually designed to provide access to the trunk from the rear of the vehicle, the trunk lid is pivoted in the opposite direction about a horizontal axis that is positioned farther forwardly at the vehicle and extends transversely to the travel direction.

In the case of the aforementioned movements, the entire trunk lid must be moved every time. In the open position, the edge removed farthest from the momentary pivot axis projects far past the vehicle so that particularly in garages having a minimal height there is a risk that the trunk lid will collide with the ceiling. Moreover, when releasing the passageway for the roof, the rear portion of the trunk lid is pivoted past the rear vehicle boundary so that there is also a collision risk to the rear of the vehicle, in particular, when the parking space is short and another vehicle is parked closely or when an obstacle is located close to the rear of the vehicle. Moreover, the rear of the vehicle, in adaptation to the far reaching pivoting movement of the rear edge of the trunk lid, must be provided with a visually unpleasing cutout.

The German patent application DE 100 39 680 A1 shows a two-part trunk lid with a joint extending transversely relative to the vehicle wherein the front part of the trunk lid positioned in front of the joint is movable with its forward edge by means of arms guided in laterally positioned guides in the longitudinal direction of the vehicle in order to pivot at the joint relative to the rear part of the lid. In this way, the total height of the trunk lid when pivoted for releasing the passageway for the roof is reduced. The pivot angle however must be large in this configuration in order to ensure a sufficient size of the passageway. However, the trunk lid projecting past the rear vehicle boundary is also a problem in this configuration.

SUMMARY OF INVENTION

It is an object of the present invention to provide a convertible vehicle with improved opening kinetics of the trunk lid.

In accordance with the present invention, this is achieved in that, when opening the trunk lid for releasing the passageway for the roof, the frontmost part of the trunk lid, viewed in the travel direction, can be moved at least partially into a position above a part positioned farther to the rear.

According to the invention, by means of the at least partially overlapped position of the parts of the trunk lid, not only the maximum total height of the moved parts is reduced upon opening of the trunk lid for releasing the passageway for the roof, but, moreover, in the open state of the trunk lid the rearmost part can be positioned at a smaller pivot angle relative to the carbody. Thus, it projects to a lesser extent, or not at all, past the rear vehicle boundary.

When in the case of pivoting in the opposite opening direction for releasing the receiving opening for luggage the frontmost part remains at rest, the height of the opened trunk lid is reduced also and, in this way, a collision risk is reduced.

In this way, with a substantially horizontal position of the frontmost part even in the open position of the trunk lid, an overall especially minimal opening height of the trunk lid can be effected.

A two-part configuration of the trunk lid is mechanically easily realized. The front part can realize water drainage upon its displacement into the position above the rear part so that a water edge of its own is not required at the front part.

In particular, it is favorable when the front end of the frontmost part engages underneath the rear roof area in the closed state of the roof and, in this way, provides an additional function as a rear deck. Matching of this area of the trunk lid to the interior design of the interior compartment, for example, by means of a textile covering, is possible because this area is protected underneath the roof when the roof is closed and, when the roof is open, is exposed to the elements in the same way as the other interior space of the vehicle.

DETAILED DESCRIPTION

Figure 1:
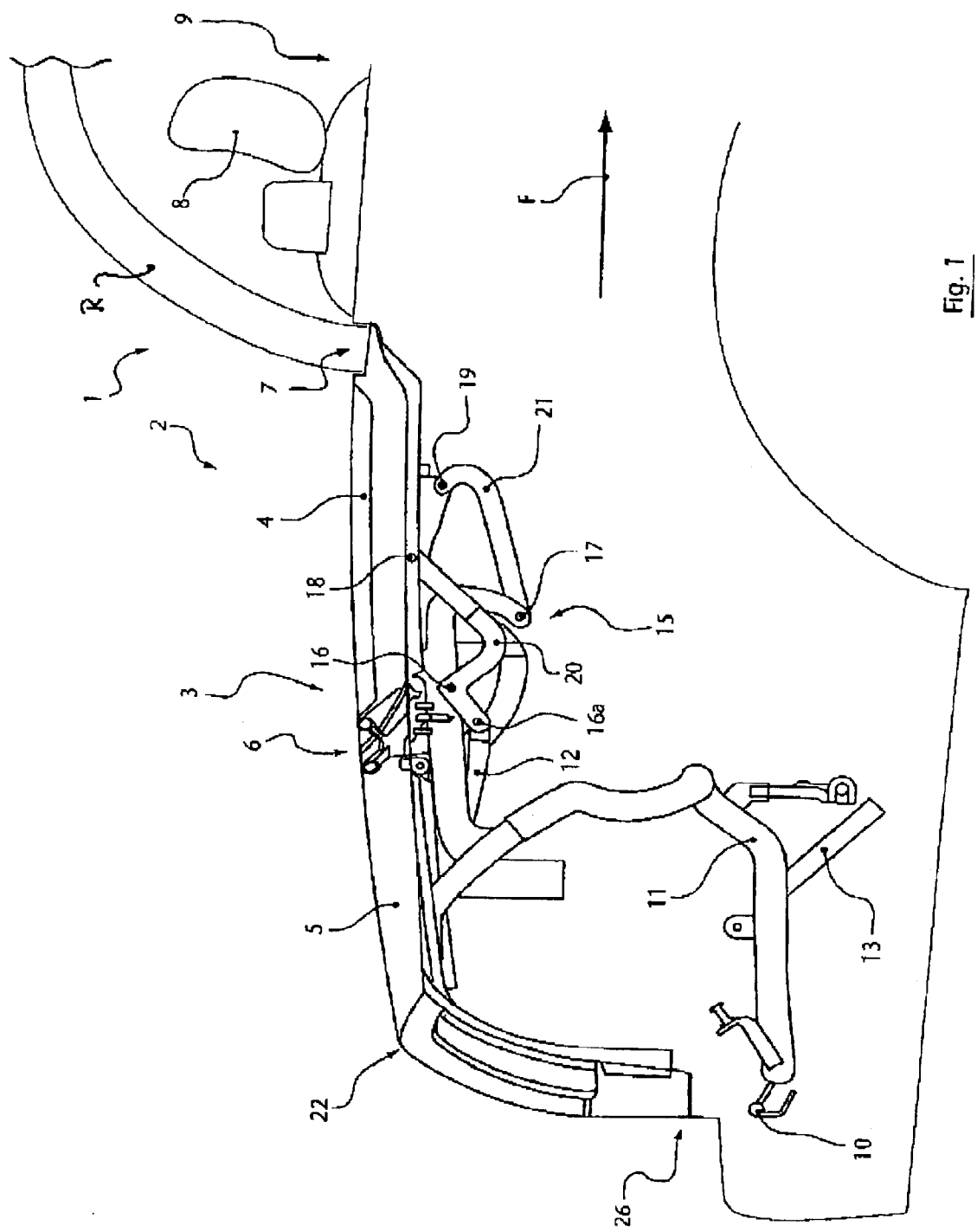
FIG. 1 is a schematic side view of the rear area of a convertible vehicle according to the invention with the trunk lid in the closed position.
Figure 2:
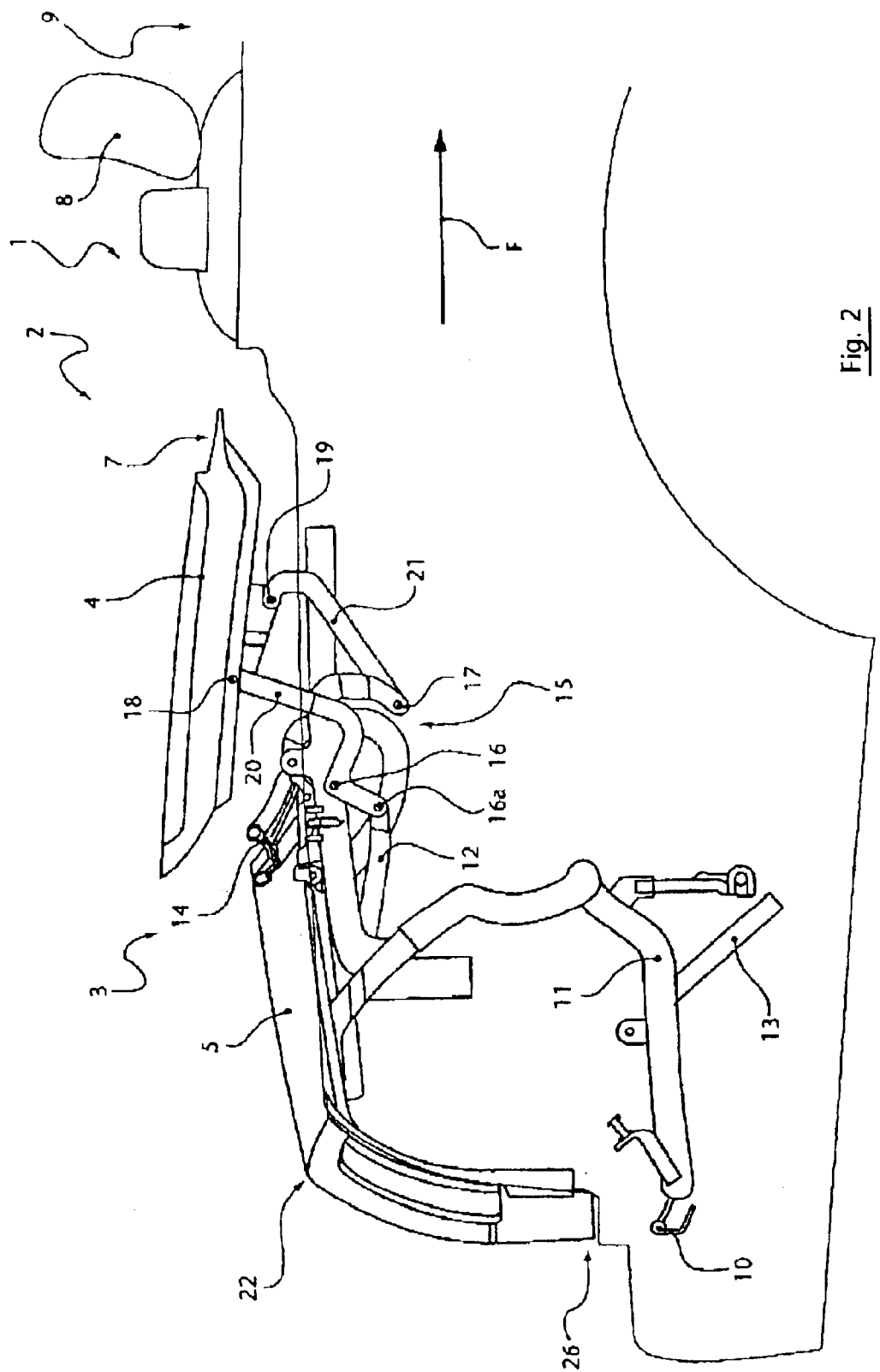
FIG. 2 is a view similar to FIG. 1 during the first opening phase of the trunk lid for releasing the passageway for the roof.
Figure 3:
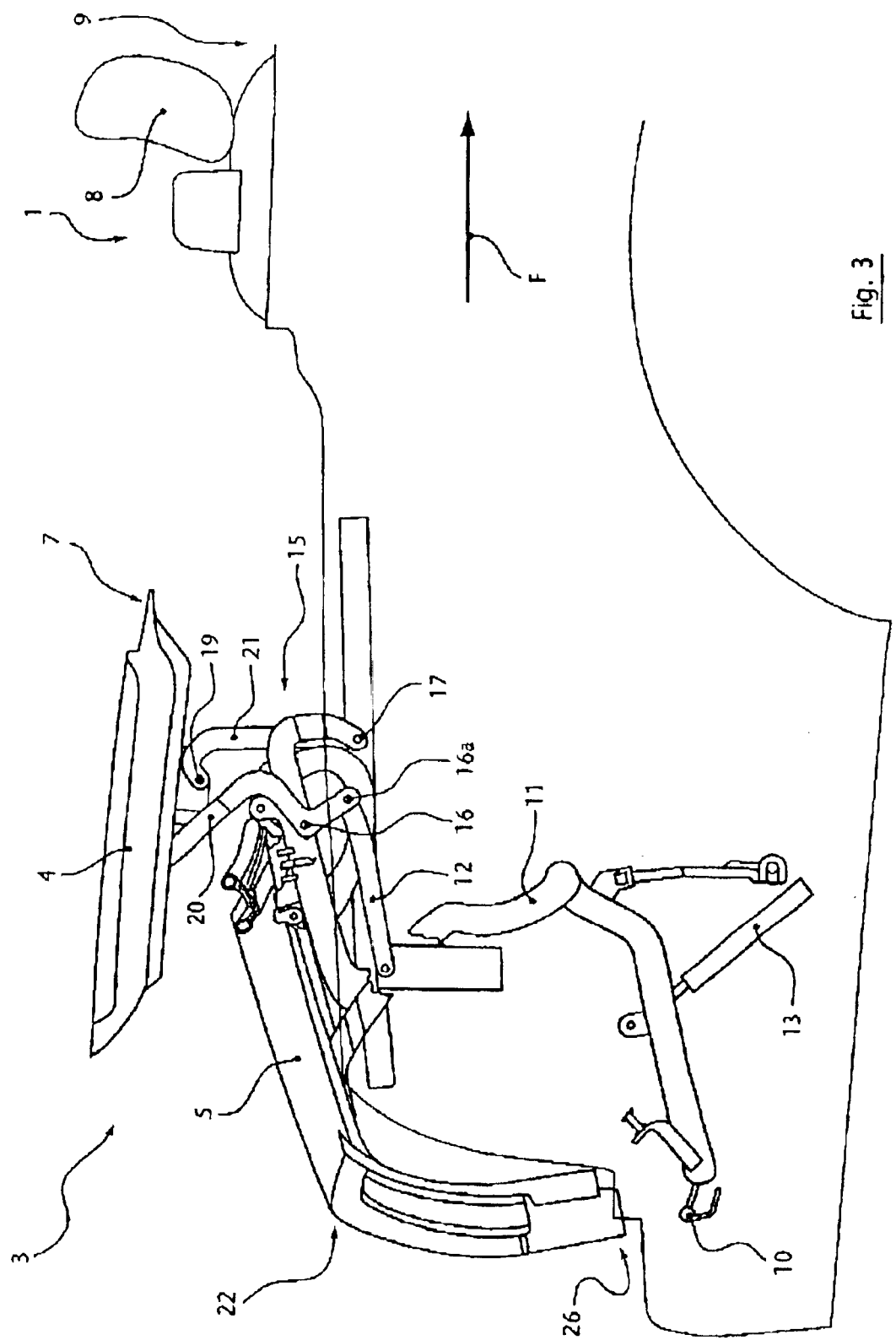
FIG. 3 is a view similar to FIG. 2 during an opening phase of the trunk lid progressing relative to FIG. 2.

The convertible vehicle illustrated in FIG. 1 and identified by reference numeral 1 has a trunk lid 3 covering or opening a stowing compartment for the roof in the rear area 2 of the carbody. In the illustrated embodiment, the trunk lid 3 is of a two-part configuration and comprises a front part 4 and a rear part 5 which adjoin one another at a joint 6. The joint 6 extends in the transverse direction of the vehicle and, in a plan view, can be arc-shaped or curved.

The two-part configuration is not mandatory. It is also possible that between the frontmost part 4 and the rearmost part 5, viewed in the travel direction, one or several additional parts of the trunk lid 3 are located which can also be moved or entrained. The two-part configuration, however, is constructively particularly easy and provides a sufficient reduction of the pivoting height as well as of the rearward projection of the open trunk lid 3.

The roof or top (only partially illustrated in the form of the rear roof end member R) of the vehicle 1 can be either completely rigid or partially rigid and flexible otherwise. A rear roof end member R, when the roof is closed, rests on the front area 7 of the front part 4. The front part 4 thus engages underneath the rear area of the closed roof.

In the illustrated embodiment, the front area 7 is illustrated as a narrow support surface. A larger extension in the travel direction F of the vehicle up to the row of seats 8 is possible. In this configuration, the area 7 can be covered by textile material or leather and can thus be matched to the interior design of the interior compartment 9.

The trunk lid 3, as a carbody part, is comprised of rigid parts 4, 5. They are made of metal or plastic. The rear part 5 is connected to an auxiliary frame 11 pivotable about a pivot axis 10 arranged to the rear. For effecting the movement, on each vehicle side at least one drive member 13 can be provided, for example.

In its forward area adjoining the joint 6 and facing away from the rear pivot axis 10, the rear part 5 has a water drainage channel 14 following the course of the joint 6.

The front part 4 is connected by a multi-bar linkage 15 to the rear part 5. In the illustrated embodiment, the linkage 15 is configured as a four-bar linkage and comprises joints 16, 17 correlated with the rear part 5 and joints 18, 19 correlated with the front part 4. The joints 16, 18 are connected to one another by bars or levers 20 bent to a hook shape, and the joints 17, 19 are connected by means of a bar or lever 21 also bent in its end area.

For moving the front part 4 relative to the rear part 5, one or several own drive members 13 can be provided. It is also possible that the relative movement of the parts 4, 5 by means of the drive members 13 is effected by an intermediate gear 12. The intermediate gear 12, in the illustrated embodiment, is formed by a control lever extending substantially in the longitudinal direction of the vehicle and connected with one end to the carbody in a pivotable way and connected with the opposite free end to the joint 16a, wherein the four-bar linkage 15 can be opened or closed by moving the control lever.

The course of the movements illustrated in FIGS. 1 through 4 shows that, when opening the trunk lid 3, initially the rear part 5 remains substantially in the initial closed position while the front part 4 is lifted slightly (FIG. 2) so that subsequently it can be moved to the rear. For this purpose, the four-bar linkage 15 opens so that the levers 20, 21 are pivoted upwardly from their essentially horizontal initial position in which the parts 4, 5 are positioned sequentially aligned with one another in the longitudinal direction of the vehicle. In the early opening phase according to FIG. 2, the rear lever 20 is almost vertical, the front lever 21 projects at a slant forwardly and upwardly. By this type of movement, the front part 4 is pulled away rearwardly from its position underneath the roof end member. Accordingly, for initiating opening of the trunk lid 3, the roof must be pivoted only slightly with its rear roof end member. As a parallel movement, the trunk lid 3 can already open. The opening and closing movement of the roof is accelerated accordingly.

The progessing opening movement (FIG. 3) moves the front part 4 almost parallel toward the rear, i.e., it essentially maintains its horizontal orientation. The rear part 5 pivots about the rear axis 10 arranged to the rear, but only by a small pivot angle Y so that its edge 22 does not project past the line 23 representing the fear vehicle boundary.

Figure 4:
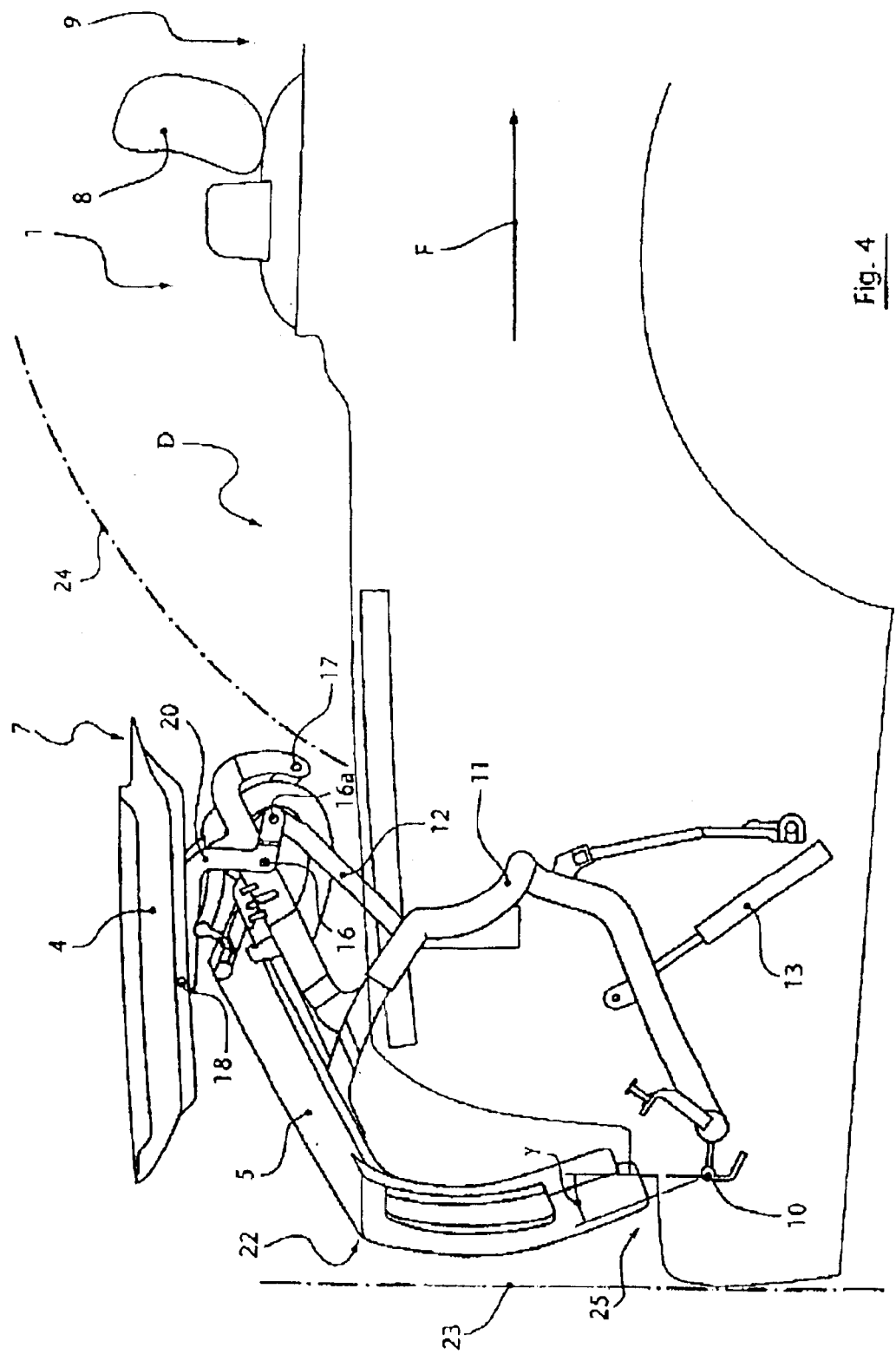
FIG. 4 is a view similar to FIG. 3 with the trunk lid being completely open.

This holds true also in the completely open state of the trunk lid 3 (FIG. 4). Accordingly, in no phase of the opening movement of the trunk lid is there a space required to the rear which would exceed the footprint or plan view contour of the vehicle.

For achieving this, the front part 4 must not be completely moved into the position above the rear part 5; it is sufficient to provide a partial overlap. Because the front area 7 of the frontmost part 4 is also lifted simultaneously with the movement to the rear, a pivot circle 24 for the rear deck (illustrated schematically in FIG. 4) is available and unobstructed. Moreover, and this represents a significant advantage of the configuration according to the invention, lowering of the bumper or providing a large cutout area in the bumper area 25 is no longer required; in the prior art such measures are needed when the lower rear edge 26 of the rear part requires a large pivot travel.

Figure 5:
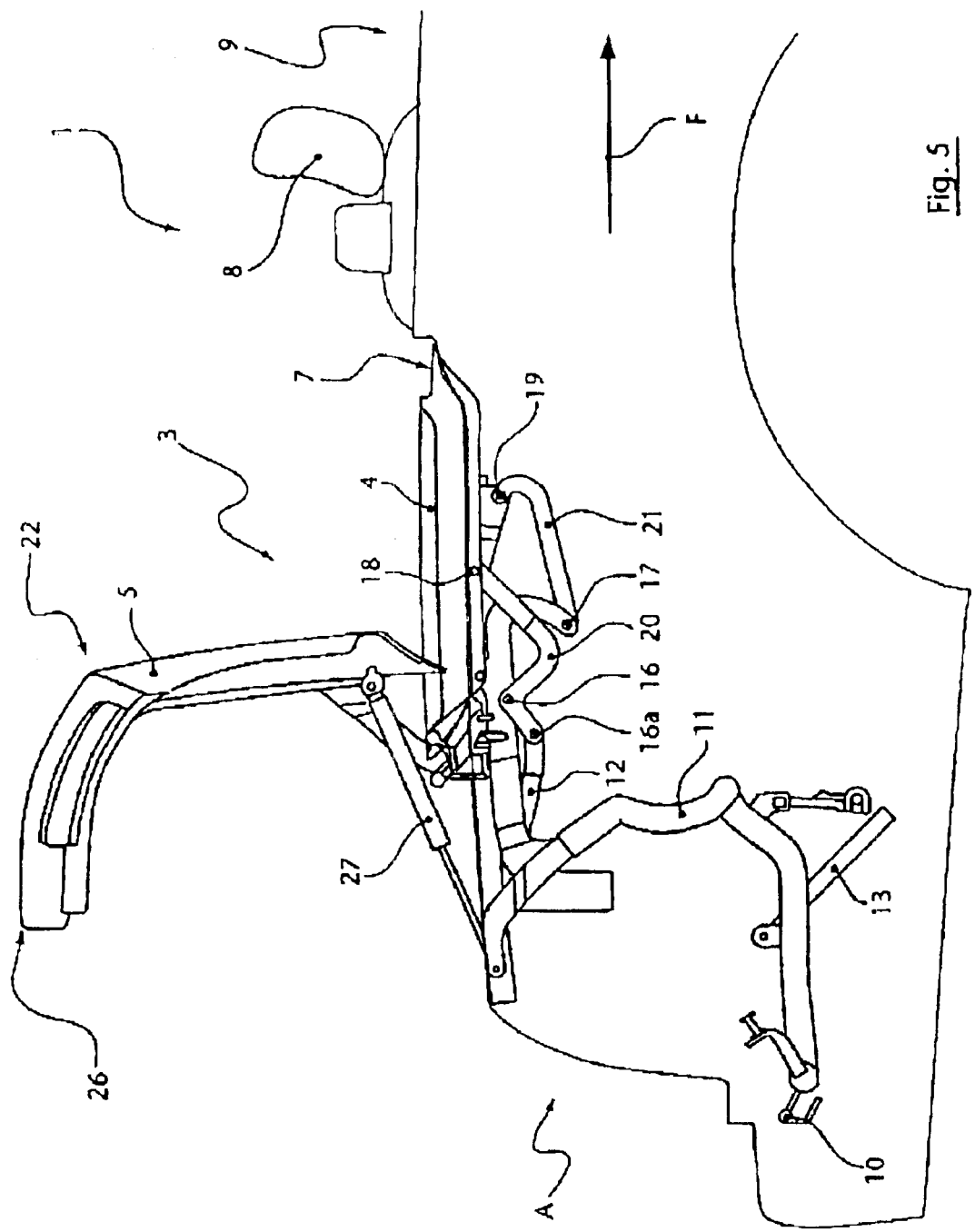
FIG. 5 is a view similar to FIG. 4 showing the trunk lid being opened in the opposite direction for releasing the receiving opening for luggage.

In the opposite opening direction of the trunk lid 3 (FIG. 5) for releasing the receiving opening A for luggage, the front part 4 remains in its rest position and only the rear part 5 is moved. This requires a reduced force expenditure. Accordingly, optionally provided assisting members for this opening movement, for example, pneumatic cylinders 27, can be small and lightweight.

Overall, the trunk lid 3 with its movement mechanism can be configured as a compact and modular unit. Since the front part 4 must not be guided separately on the carbody, the tolerances that must be observed can be generous.

While specific embodiments of the invention have been shown and described in detail to illustrate the inventive principles, it will be understood that the invention may be embodied otherwise without departing from such principles.

What is claimed is:

1. A convertible vehicle comprising:

a carbody with a rear area (2) provided with a trunk lid (3);

a roof stowable within the rear area of the convertible vehicle underneath the trunk lid (3);

wherein the trunk lid (3) is movable in a first direction for releasing a passageway (D) for the roof and in a second direction for releasing a receiving opening (A) for luggage;

wherein the trunk lid (3) is divided into several parts (4, 5) along at least one joint (6) extending substantially in a transverse vehicle direction;

wherein, when opening the trunk lid (3) in the first direction, a frontmost one of the several parts (4) of the trunk lid (3), viewed in a forward travel direction of the convertible vehicle, is moved opposite to *n the forward travel direction at least partially into a position above a rearwardly positioned one (5) of the several parts.

2. The convertible vehicle according to claim 1, wherein, when releasing the receiving opening (A) for luggage, the frontmost part (4) remains in a rest position.

3. The convertible vehicle according to claim 1, wherein the frontmost part (4) in a rest position, when the roof is in the closed position, engages underneath a rearward roof end member of the roof.

4. The convertible vehicle according to claim 3, wherein the frontmost part (4) extends into close proximity of a row of seats (8) of an interior compartment (9) of the vehicle.

5. The convertible vehicle according to claim 3, wherein at least a front area (7) of the frontmost part (4) is provided with a surface matched to a textile covering of an interior compartment (9) of the vehicle.

6. The convertible vehicle according to claim 1, wherein the frontmost part (4) in a rest position is at least substantially horizontally positioned and is moved substantially parallel upwardly and rearwardly relative to the forward travel direction when opening the trunk lid (3) for releasing the passageway (D) for the roof.

7. The convertible vehicle according to claim 6, wherein, in a completely open position of the trunk lid (3) for releasing the passageway (D) for the roof, the frontmost part (4) is positioned in an at least substantially horizontal position.

8. The convertible vehicle according to claim 1, wherein the trunk lid (3) consists of two (4, 5) of the several parts and a single one of the at least one joint (6).

9. The convertible vehicle according to claim 1, where in the two parts (4, 5) of the trunk lid (3) are connected to one another by at least one multi-bar linkage (15).

10. The convertible vehicle according to claim 9, wherein the at least one multi-bar linkage (15) is a four-bar linkage and acts as a parallelogram linkage for moving the two parts relative to one another.

11. The convertible vehicle according to claim 10, further comprising at least one control lever (12) acted upon directly by at least one drive member (13), wherein the at last one multi-bar linkage (15) is movable by the at least one control lever (12) acted upon by the at least one drive member (13).

12. The convertible vehicle according to claim 9, wherein the at least one multi-bar linkage (15) has bars (20,21) bent at several locations in order to adapt a shape of the bars (20, 21) to a relative movement of the several parts (4, 5).

13. The convertible vehicle according to claim 10, further comprising at least one control lever (12) acted upon indirectly by at least one drive member (13), wherein the at least one multi-bar linkage (15) is movable by the at least one control lever (12) acted upon by the at least one drive member (13).

* * * * *

UNITED STATES PATENT AND TRADEMARK OFFICE
CERTIFICATE OF CORRECTION

PATENT NO. : 6,786,525 B2
DATED : September 7, 2004
INVENTOR(S) : Klaus Russke et al.

It is certified that error appears in the above-identified patent and that said Letters Patent is hereby corrected as shown below:

Title page,
Insert Item
-- [30] Foreign Application Priority Data
June 5, 2002   (DE)    102 24 834.6 --

Signed and Sealed this

Third Day of May, 2005

JON W. DUDAS
*Director of the United States Patent and Trademark Office*